(12) United States Patent
Ohno et al.

(10) Patent No.: US 11,261,838 B2
(45) Date of Patent: Mar. 1, 2022

(54) IGNITION SYSTEM

(71) Applicant: DENSO CORPORATION, Kariya (JP)

(72) Inventors: Takashi Ohno, Kariya (JP); Keiko Miyake, Kariya (JP); Yasuo Kakumae, Kariya (JP); Kanechiyo Terada, Kariya (JP)

(73) Assignee: DENSO CORPORATION, Kariya (JP)

( * ) Notice: Subject to any disclaimer, the term of this patent is extended or adjusted under 35 U.S.C. 154(b) by 12 days.

(21) Appl. No.: 16/800,056

(22) Filed: Feb. 25, 2020

(65) Prior Publication Data

US 2020/0191107 A1 Jun. 18, 2020

Related U.S. Application Data

(63) Continuation of application No. PCT/JP2018/031326, filed on Aug. 24, 2018.

(30) Foreign Application Priority Data

Aug. 31, 2017 (JP) .............................. JP2017-167114

(51) Int. Cl.
*F02P 1/08* (2006.01)
*H02H 3/20* (2006.01)
*F02P 15/10* (2006.01)

(52) U.S. Cl.
CPC .............. *F02P 1/083* (2013.01); *H02H 3/20* (2013.01); *F02P 15/10* (2013.01)

(58) Field of Classification Search
CPC .. F02P 15/00; F02P 15/10; F02P 1/083; F02P 3/00; F02P 3/04; F02P 3/05; H02H 3/20

USPC ......................................... 123/605, 618, 621
See application file for complete search history.

(56) References Cited

U.S. PATENT DOCUMENTS

| | | | |
|---|---|---|---|
| 4,998,526 A | 3/1991 | Gokhale | |
| 9,371,814 B2* | 6/2016 | Eisen | F02P 1/00 |
| 2005/0257782 A1* | 11/2005 | Regazzi | F02P 1/083 |
| | | | 123/599 |
| 2016/0061177 A1* | 3/2016 | Ishitani | F02P 3/0435 |
| | | | 123/623 |
| 2016/0245255 A1* | 8/2016 | Sekine | F02N 11/0862 |
| 2017/0045025 A1* | 2/2017 | Nakayama | F02P 17/12 |
| 2018/0358782 A1* | 12/2018 | Miyake | F02P 3/01 |
| 2020/0049120 A1* | 2/2020 | Ohno | F02P 3/10 |

FOREIGN PATENT DOCUMENTS

JP 2015-200284 11/2015

* cited by examiner

*Primary Examiner* — Phutthiwat Wongwian
*Assistant Examiner* — Diem T Tran
(74) *Attorney, Agent, or Firm* — Nixon & Vanderhye P.C.

(57) ABSTRACT

An ignition system includes a primary coil, a secondary coil, a first switch, a second switch, a third switch, a diode, and a switch control section. In the primary coil, a power supply is connected to a contact point between a first winding and a second winding. The secondary coil is magnetically coupled to the primary coil. The first switch is connected in series with the first winding. The second switch is connected in series with the second winding on the opposite side from the contact point. The third switch is connected in series with the second switch. The diode includes an anode connected between the second switch and the third switch and a cathode connected to the contact point. The switch control section controls opening and closing of each switch.

10 Claims, 7 Drawing Sheets

IGNITION SYSTEM

CROSS-REFERENCE TO RELATED APPLICATION

This application is the U.S. bypass application of International Application No. PCT/JP2018/031326 filed Aug. 24, 2018 which designated the U.S. and claims priority to Japanese Patent Application No. 2017-167114, filed Aug. 31, 2017, the contents of which are incorporated herein by reference.

TECHNICAL FIELD

The present disclosure relates to an ignition system used in an internal combustion engine.

BACKGROUND

In recent years, to improve the fuel efficiency of an internal combustion engine for automobiles, studies have been conducted on techniques regarding lean fuel combustion control (lean-burn engine) or EGR that recirculates combustion gas to the cylinders of the internal combustion engine. Regarding these techniques, to effectively burn the fuel contained in an air-fuel mixture, studies have been conducted on a continuous discharge mode that causes an ignition plug to continuously generate spark discharges for a certain period of time close to the ignition timing.

SUMMARY

A first aspect system includes an ignition system, which causes an ignition plug to generate a spark discharge. The ignition system includes a primary coil, a secondary coil, a first switch, a second switch, a third switch, a diode, and a switch control section. The primary coil includes a first winding and a second winding connected in series with the first winding. A power supply is connected to a contact point between the first winding and the second winding. The secondary coil is connected to the ignition plug and is magnetically coupled to the primary coil. The first switch is located closer to the first winding than the contact point is, and is connected in series with the first winding. The second switch is connected in series with the second winding on a side opposite to the contact point. The third switch is located between a ground and the second switch and is connected in series with the second switch. The diode includes an anode connected between the second switch and the third switch and a cathode connected to the contact point. The switch control section controls opening and closing of the first switch, the second switch, and the third switch.

BRIEF DESCRIPTION OF THE DRAWINGS

The above objects and other objects, features and advantages of the present disclosure will be made clearer by the following detailed description, given referring to the appended drawings. In the accompanying drawings:

FIGS. 6(*a*) and 6(*b*) are circuit diagrams when energy supply ignition is performed;

DETAILED DESCRIPTION OF THE PREFERRED EMBODIMENTS

A continuous discharge ignition system disclosed in, for example, Japanese Laid-Open Patent Publication No. 2015-200284 includes a center tap in the middle of the winding of a primary coil. In the ignition system, main ignition is started at an ignition plug by applying a current to a winding from the center tap to one end of the primary coil (hereinafter, referred to as a first winding). Subsequently, by turning on an energy supply switch to pass a current to a winding from the center tap of the primary coil to the other end (hereinafter, referred to as a second winding), the current is sequentially added and passed through the secondary coil in the same direction as the current (secondary current) that flows when the main ignition is started. Thus, a spark discharge is maintained at the ignition plug.

In the ignition system, to generate a secondary voltage that is enough to maintain the spark discharge at the ignition plug in the secondary coil without using a boost circuit, it is necessary to increase the turn ratio between the second winding and the secondary coil. For example, the turn ratio between the second winding and the secondary coil is in the hundreds. Thus, if a malfunction occurs in which the impedance of the second winding is reduced, so that an overvoltage is applied from the side of a power supply terminal, the energy supply switch may possibly receive the overvoltage, resulting in a breakdown. The discloser of the present application focused on the point that the ignition system tends to be increased in size by adding a protection circuit.

In the ignition system, the interruption of a primary current (current that flows through the primary coil) caused when the energy supply switch is turned off undesirably decreases the secondary current (current that flows through the secondary coil) rapidly. If the secondary current is rapidly decreased, the spark discharge may possibly fail to be maintained.

The present disclosure is intended to solve the above problems. The main object is to provide an ignition system that protects a switch when an overvoltage is applied to the switch and is capable of inhibiting a secondary current from being rapidly decreased in maintaining a spark discharge.

A first aspect for solving the above problems includes an ignition system, which causes an ignition plug to generate a spark discharge. The ignition system includes a primary coil, a secondary coil, a first switch, a second switch, a third switch, a diode, and a switch control section. The primary coil includes a first winding and a second winding connected in series with the first winding. A power supply is connected to a contact point between the first winding and the second winding. The secondary coil is connected to the ignition plug and is magnetically coupled to the primary coil. The first switch is located closer to the first winding than the contact point is, and is connected in series with the first winding. The second switch is connected in series with the second winding on a side opposite to the contact point. The third switch is located between a ground and the second switch and is connected in series with the second switch. The diode includes an anode connected between the second switch and the third switch and a cathode connected to the contact point. The switch control section controls opening and closing of the first switch, the second switch, and the third switch.

According to the above configuration, after the first switch is closed to pass a current from the power supply to the first winding, the first switch is opened to interrupt the passage of the current from the power supply to the first winding, so that a spark discharge is generated at the ignition plug, and a secondary current flows through the secondary coil. After starting the spark discharge, the second switch and the third switch are closed to pass a current from the power supply to the second winding. This allows a current to flow in the same direction as and be superimposed on the secondary current that flows through the secondary coil, so that the spark discharge is maintained.

In maintaining the spark discharge, when the third switch is opened with the second switch kept closed, the current from the power supply is interrupted. However, the current is recirculated to the second winding through the diode by the inductance of the second winding and is attenuated. Thus, in maintaining the spark discharge, the current that flows through the second winding is prevented from being rapidly decreased, and the secondary current that flows through the secondary coil is inhibited from being rapidly decreased.

The second switch and the third switch are connected in series. Thus, even if a malfunction occurs in which an overvoltage is applied from the side of the power supply, the applied voltage is distributed to the second switch and the third switch. In the embodiment of the present application in which the impedance of the second winding is set smaller than that of the first winding, even if a malfunction occurs in which an overvoltage is applied from the side of the power supply, the second switch and the third switch are protected.

Consequently, if an overvoltage is applied from the side of the power supply, the switches are protected, and in maintaining the spark discharge, the secondary current is inhibited from being rapidly decreased.

In a second aspect, when starting the spark discharge, the switch control section opens the second switch and closes the first switch to pass a current from the power supply to the first winding, and subsequently opens the first switch to interrupt the passage of the current from the power supply to the first winding.

According to the above configuration, in starting the spark discharge, a current is prevented from flowing from the power supply to the second winding, so that a magnetic field is prevented from being generated in the second winding, which shares a magnetic circuit with the first winding, and a current is prevented from flowing that would otherwise be caused by a voltage in the second winding generated by the energization of the first winding. This prevents a magnetic field caused by the current that flows through the first winding from being decreased, so that the spark discharge is started in an appropriate manner.

In a third aspect, when maintaining the spark discharge after starting the spark discharge, the switch control section closes the second switch and opens and closes the third switch with the second switch kept closed.

According to the above configuration, the second switch is closed after starting the spark discharge, and the third switch is opened and closed with the second switch kept closed, so that the passage of the current from the power supply to the second winding is permitted and stopped repeatedly. This allows a current to flow in the same direction as and be superimposed on the secondary current for the spark discharge that flows through the secondary coil, so that the spark discharge is maintained.

In maintaining the spark discharge, when the third switch is opened with the second switch kept closed, the current is recirculated to the second winding through the diode. Thus, in maintaining the spark discharge, the current that flows through the second winding is prevented from being rapidly decreased, and the secondary current that flows through the secondary coil is inhibited from being rapidly decreased.

In a fourth aspect, the ignition system further includes a secondary current detection section, which detects a secondary current that flows through the secondary coil. When maintaining the spark discharge, the switch control section opens and closes the third switch based on the secondary current detected by the secondary current detection section.

According to the above configuration, the secondary current is detected, and the third switch is opened and closed based on the detected secondary current. Thus, the secondary current is reliably maintained at an appropriate value.

In a fifth aspect, when starting the spark discharge, the switch control section closes the second switch after a predetermined period of time at which the discharge should have started after starting the spark discharge regardless of whether to maintain the spark discharge.

For example, in the state in which the ignition plug has come off and the current does not flow through the secondary coil, if the first switch is opened and closed to start the spark discharge, a high voltage may possibly occur in the secondary coil that attenuates while alternating the polarity starting from a negative polarity. If a polarity-alternated high voltage occurs in the secondary coil, a polarity-alternated high voltage without load may also occur in the second winding in accordance with the turn ratio. When a positive high voltage occurs in the second winding, an overvoltage may possibly be applied to the second switch and the third switch. With the above configuration, after starting the spark discharge, the switch control section closes the second switch after a predetermined period of time at which the discharge should have started and before the first point in time at which the polarity of the secondary voltage without load is reversed regardless of whether to maintain the spark discharge. Thus, even if a positive high voltage occurs in the second winding, the second switch is closed to recirculate the current through the second winding, the second switch, and the diode. This inhibits a positive overvoltage caused by the secondary voltage from being applied to the second switch and the third switch.

In a sixth aspect, the ignition system includes a backflow prevention diode, which is located between the contact point and the power supply and includes an anode connected to a side of the power supply and a cathode connected to a side of the contact point.

In general, the second switch and the third switch include, for example, antiparallel connected body diodes. Thus, if the power supply is connected in reverse, a large current may possibly flow through the circuit via, for example, the body diodes. In this respect, according to the above configuration, the backflow prevention diode protects the circuit even if the power supply is connected in reverse. In particular, even if the impedance of the second winding is small, a large current is prevented from flowing through the circuit.

In a seventh aspect, the ignition system includes a backflow prevention diode, which is a diode connected between the second switch and the third switch and includes an anode connected to anodes of the second switch and the diode and a cathode connected to the third switch.

In general, the second switch and the third switch include, for example, antiparallel connected body diodes. Thus, if the power supply is connected in reverse, a large current may possibly flow through the circuit via, for example, the body diodes. In this respect, according to the above configuration, the backflow prevention diode protects the circuit even if the power supply is connected in reverse. In particular, even if the impedance of the second winding is small, a large current is prevented from flowing through the circuit.

Compared with the case in which the backflow prevention diode is located between the contact point and the power supply, the amount of heat generation is reduced since the energization current to the first winding for starting the spark discharge cannot be passed through the backflow prevention diode. The voltage applied from the power supply to the first winding is also inhibited from being decreased by the backflow prevention diode. In this case also, since the first winding has an impedance greater than that of the second winding, even if the power supply is connected in reverse, a large current is unlikely to flow through the first switch.

In an eighth aspect, a turn ratio, which is a value obtained by dividing the number of turns of the secondary coil by the number of turns of the second winding, is greater than a voltage ratio, which is a value obtained by dividing a discharge maintaining voltage necessary for maintaining the spark discharge by an applied voltage of the power supply.

According to the above configuration, in maintaining the spark discharge, the energy is supplied without a boost circuit.

In a ninth aspect, the power supply that applies a voltage to the first winding is a vehicle-mounted power supply and is shared as a power supply for applying a voltage to the second winding.

According to the above configuration, since no power supply is necessary in the ignition system, the ignition system is reduced in size. Since the use of the vehicle-mounted power supply eliminates the need for a special power supply, the ignition system is reduced in size. Since the shared use of the vehicle-mounted power supply eliminates the need for multiple power supplies, the ignition system is reduced in size.

In a tenth aspect, the primary coil, the secondary coil, the first switch, the second switch, the third switch, the diode, and the switch control section are accommodated in a case of an ignition coil.

According to the above configuration, the accommodation in the case of the ignition coil improves the ease of mounting on the vehicle and reduces the wiring.

Hereinafter, an ignition system according to one embodiment will be described with reference to the drawings. The ignition system is applied to a multi-cylinder gasoline engine (internal combustion engine) mounted on a vehicle. Like or the same components in the following embodiments are given the same reference numerals in the drawings. The engine is, for example, an in-cylinder direct injection engine that is capable of operating in, for example, a lean-burn mode and includes a circular flow control section, which generates circular flow (such as tumble flow and swirl flow) of an air-fuel mixture in the cylinders. The ignition system ignites the air-fuel mixture in a combustion chamber of the engine at a predetermined ignition timing. The ignition system is a direct ignition (DI) system that uses an ignition coil corresponding to an ignition plug of each cylinder.

Figure 1:
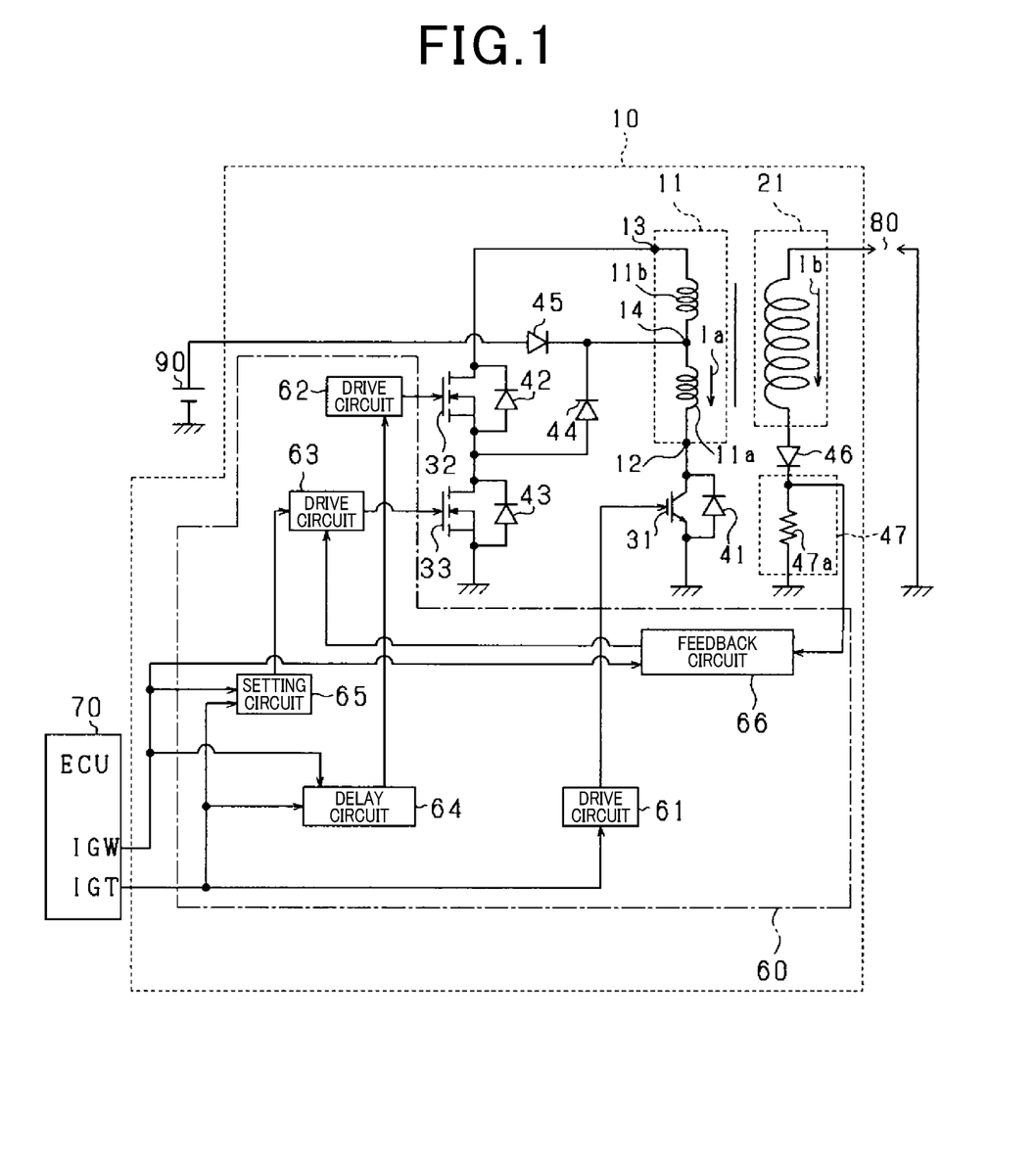
FIG. 1 is a circuit diagram showing an electrical configuration of an ignition system.

As shown in FIG. 1, an ignition system 10 controls energization of a primary coil 11 of an ignition coil based on an instruction signal (a main ignition signal IGT and an energy supply signal IGW) given from an electronic control unit (ECU) 70 constituting the major part of the engine control. The ignition system 10 controls the energization of the primary coil 11 to control the electrical energy generated in a secondary coil 21 of the ignition coil, thus controlling a spark discharge that occurs at an ignition plug 80.

The ECU 70 selects an ignition mode in accordance with the engine parameters (such as the warm-up state, the engine speed, and the engine load) acquired from various sensors and the control state of an engine 100 (such as whether lean burn operation is performed and the degree of the swirling flow) and generates and outputs the main ignition signal IGT (e.g., IGT1, IGT2, and IGTX for respective configurations of the ignition system 10 as show in FIG. 2) and the energy supply signal IGW in accordance with the ignition mode.

More specifically, the ECU 70 is configured to select and execute either main ignition (inductive discharge main ignition) or energy supply ignition, which is executed to overlap the main ignition, in accordance with the engine speed and the engine load. The main ignition is the mode with the least energy consumption and the least spark energy and is the mode suitable for the operation in, for example, a stoichiometric region. The energy supply ignition is the mode that requires the most supplied energy to continue passing a secondary current Ib of the same polarity to the ignition plug 80 continuously. However, the energy supply ignition is the mode suitable for the case in which the airflow speed in the engine is fast due to forced induction and supply of EGR, so that the spark is influenced to be extended or blown out by the airflow.

When executing the main ignition, the ECU 70 outputs only the main ignition signal IGT. When executing the energy supply ignition, the ECU 70 outputs the energy supply signal IGW in addition to outputting the main ignition signal IGT.

The ignition system 10 includes the primary coil 11, the secondary coil 21, switching elements 31 to 33, diodes 41 to 46, a current detection circuit 47, and a control circuit 60.

Figure 2:
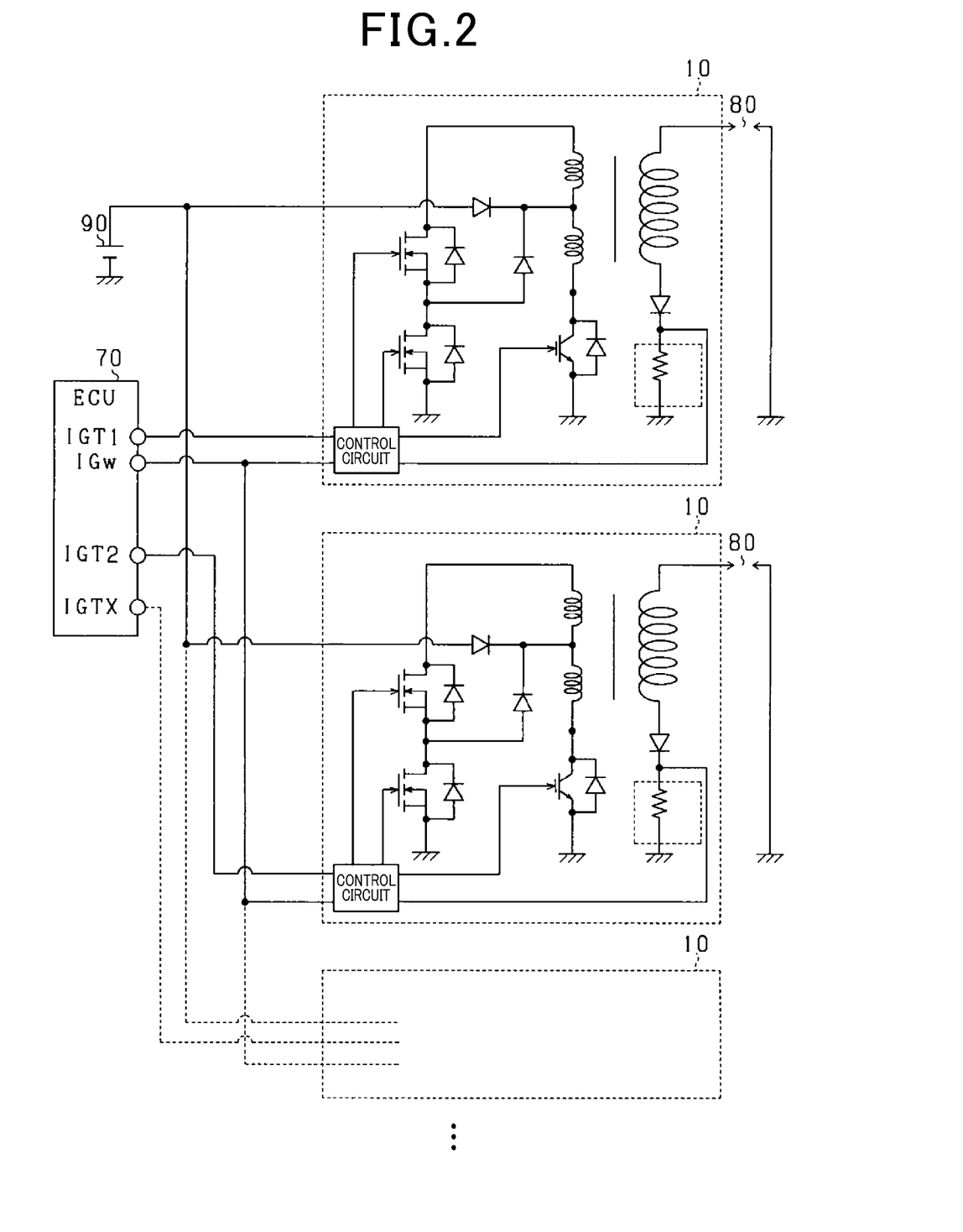
FIG. 2 is a diagram showing the ignition system applied to a multi-cylinder engine.

As shown in FIG. 2, the ignition plug 80 and the ignition system 10 are mounted on each of the cylinders of the engine 100. Although the ignition system 10 is provided for each of ignition plugs 80, the structure corresponding to one ignition plug 80 will be illustrated in this description.

Figure 3:
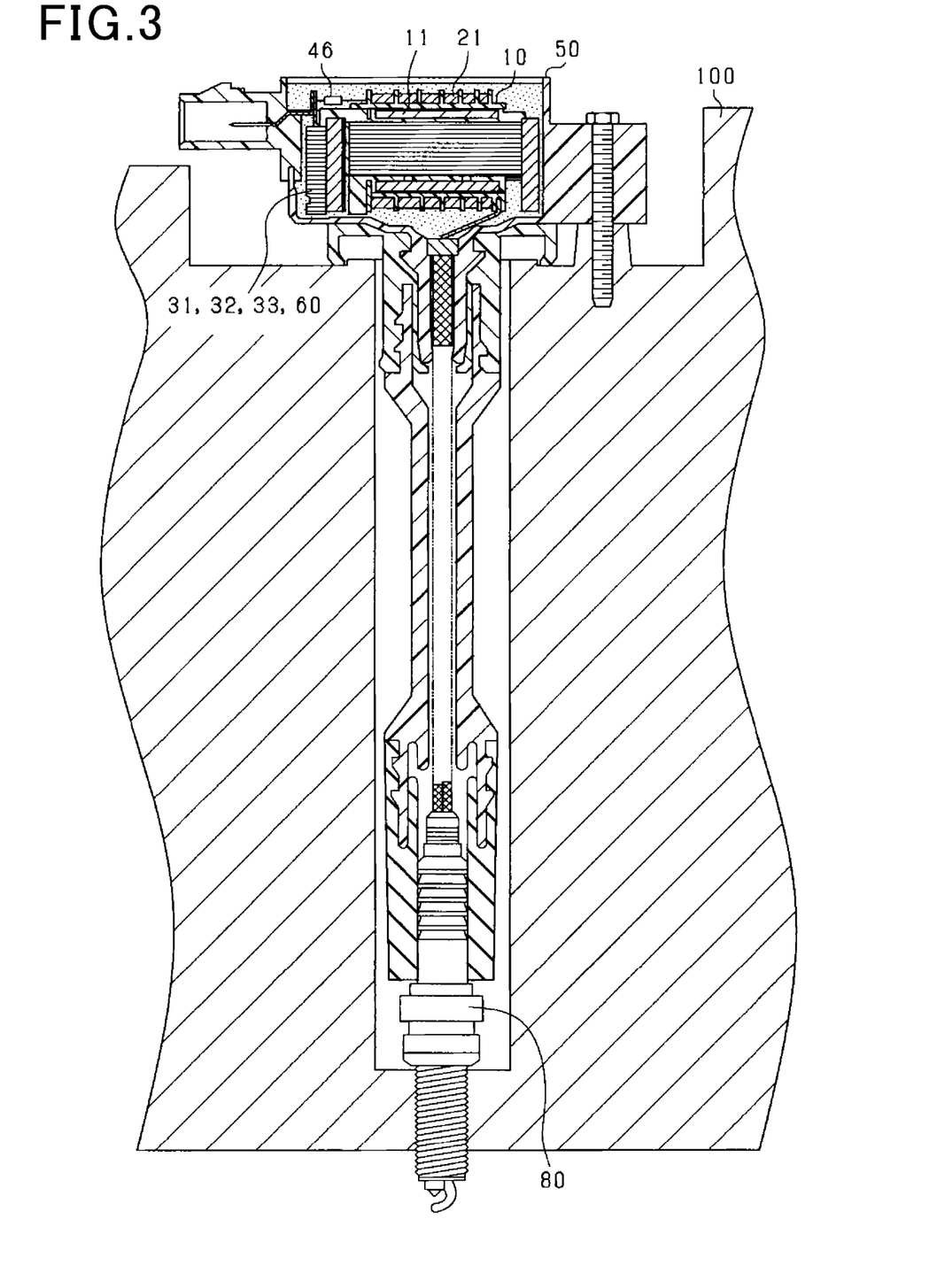
FIG. 3 is a cross-sectional view of a case of an ignition coil.

The structures of the ignition system 10 are accommodated in a case 50 of the ignition coil, and the case 50 is mounted on the engine 100 as shown in FIG. 3. This reduces wiring and inhibits the size of the ignition system 10 from being increased. Thus, the ease of mounting the ignition system 10 on the vehicle is improved.

The ignition plug 80 has a known structure and includes, as shown in FIG. 1, a central electrode, which is connected to one end of the secondary coil 21 through an output terminal, and an outside electrode, which is connected (grounded) to a ground (GND) through, for example, the cylinder head of the engine 100. The other end of the secondary coil 21 is connected (grounded) to the GND through the diode 46 and a current detection resistance 47a. The anode of the diode 46 is connected to the secondary coil 21, and the cathode of the diode 46 is connected to the current detection resistance 47a.

The current detection resistance 47a constitutes the current detection circuit 47. The current detection circuit 47 is a secondary current detection section, which detects the secondary current Ib flowing through the secondary coil 21. The current detection circuit 47 outputs a signal corresponding to the detected secondary current Ib to the control circuit

60. The diode 46 inhibits the spark discharge caused by an unwanted voltage generated at the start of energization of the primary coil 11. The ignition plug 80 causes the spark discharge between the central electrode and the outside electrode by the electrical energy generated in the secondary coil 21.

The ignition coil includes the primary coil 11 and the secondary coil 21, which is magnetically coupled to the primary coil 11. The number of turns of the secondary coil 21 is greater than the number of turns of the primary coil 11.

The primary coil 11 includes a first terminal 12, a second terminal 13, and a center tap 14. In the primary coil 11, the winding between the first terminal 12 and the center tap 14 is a first winding 11a, and the winding between the center tap 14 and the second terminal 13 is a second winding 11b. That is, the primary coil 11 includes the first winding 11a and the second winding 11b, which is connected in series with the first winding 11a. The primary coil 11 includes the first terminal 12, which is on the opposite side of the first winding 11a from the center tap 14, and the second terminal 13, which is on the opposite side of the second winding 11b from the center tap 14. The center tap 14 is a contact point between the first winding 11a and the second winding 11b.

The center tap 14 is connected to a power supply, which is a battery 90, through a backflow prevention diode 45. The battery 90 is, for example, a known lead battery and supplies a voltage of 12V. The battery 90 is a vehicle-mounted power supply. The anode of the backflow prevention diode 45 is connected to the battery 90, and the cathode of the backflow prevention diode 45 is connected to the center tap 14.

The first terminal 12 of the primary coil 11 is connected to a first switch, which is the switching element 31. The switching element 31 is, for example, a semiconductor switching element such as a power transistor and an insulated-gate bipolar transistor (IGBT). The output terminal of the switching element 31 is connected (grounded) to the GND. That is, the switching element 31 is located between the first terminal 12 and the GND and is connected in series with the first winding 11a. The switching element 31 is configured to connect and disconnect between the first terminal 12 and the GND based on the signal from the control circuit 60.

The diode 41 may be connected in parallel to the switching element 31. The anode of the diode 41 is connected (grounded) to the GND, and the cathode of the diode 41 is connected between the first terminal 12 and the switching element 31.

The second terminal 13 is connected to the GND through a second switch, which is the switching element 32, and a third switch, which is the switching element 33. The second winding 11b, the switching element 32, and the switching element 33 are connected in series. The switching elements 32 and 33 are, for example, semiconductor switching elements such as a power transistor and a MOS transistor.

That is, the switching element 32 is located between the second terminal 13 and the switching element 33 and is configured to connect and disconnect between the second terminal 13 and the switching element 33 based on the signal from the control circuit 60. The switching element 33 is located between the switching element 32 and the GND and is configured to connect and disconnect between the switching element 32 and the GND based on the signal from the control circuit 60.

The switching element 32 and the switching element 33 are connected in parallel to the diodes 42 and 43 respectively. The diodes 42 and 43 may be a parasitic diode of a MOS transistor. The anode of the diode 42 is connected between the switching element 32 and the switching element 33, and the cathode of the diode 42 is connected between the switching element 32 and the second terminal 13. The anode of the diode 43 is connected between the switching element 33 and the GND, and the cathode of the diode 43 is connected between the switching element 32 and the switching element 33.

The anode of the diode 44 is connected between the switching element 32 and the switching element 33. The cathode of the diode 44 is connected to the center tap 14. That is, the cathode of the diode 44 is connected between the center tap 14 and the backflow prevention diode 45. The diode 44 may be a diode that uses, for example, a transistor or a MOS.

The control circuit 60 (which corresponds to a switch control section) includes, for example, an input/output interface, drive circuits 61 to 63, a delay circuit 64, a setting circuit 65, and a feedback circuit 66. The control circuit 60 controls the open and closed state (connection/disconnection state, ON/OFF state) of the switching elements 31 to 33 based on, for example, the instruction signal from the ECU 70 and the output of the current detection circuit 47. Thus, the control circuit 60 selects and executes one of two ignition modes including "main ignition (inductive discharge main ignition)" and "energy supply ignition". Hereinafter, the control circuit 60 will be described in detail.

The drive circuit 61 is configured to receive the main ignition signal IGT from the ECU 70. During the time period in which the main ignition signal IGT is received (during a high state), the drive circuit 61 outputs a signal to the switching element 31 (brings into the high state) so that the switching element 31 is closed (connected state, ON state).

The drive circuit 62 is configured to receive a signal from the delay circuit 64. During the time period in which the signal from the delay circuit 64 is received (during the high state), the drive circuit 62 outputs a signal to the switching element 32 (brings into the high state) so that the switching element 32 is closed (connected state, ON state).

The drive circuit 63 is configured to receive a signal from the feedback circuit 66. During the time period in which the signal from the feedback circuit 66 is received (during the high state), the drive circuit 63 outputs a signal to the switching element 33 (brings into the high state) so that the switching element 33 is closed (connected state, ON state).

The delay circuit 64 is configured to receive the main ignition signal IGT and the energy supply signal IGW. The delay circuit 64 outputs a signal to the drive circuit 62 (brings into the high state) after a predetermined time T1 has elapsed from when the main ignition signal IGT made a transition from the high state to the low state (when a falling edge is received). The time T1 is set to be greater than or equal to the time period from when the main ignition is started to cause flying sparks between the plug electrodes to when the secondary current occurs, so that the current supplied to the second winding 11b through an energy supply operation does not influence a main ignition operation.

At this time, if the energy supply signal IGW is not received (not in the high state) when the main ignition signal IGT makes a transition from the high state to the low state, the delay circuit 64 outputs the signal (brings into the high state) only for a predetermined time T2. If the energy supply signal IGW is received, the delay circuit 64 stops outputting the signal to the drive circuit 62 (brings the signal into the low state) based on the energy supply signal IGW even before the predetermined time T2 elapses. More specifically, if the supply of the energy supply signal IGW is stopped (makes a transition from the high state to the low state), the delay circuit 64 stops outputting the signal to the drive circuit 62 (brings the signal into the low state). It is desirable that the predetermined time T2 be greater than the maximum value of the supply time of the energy supply signal IGW, so that while the energy supply signal IGW is received, the energy is reliably supplied.

The setting circuit 65 sets an upper limit value and a lower limit value of a target secondary current based on the difference between the rising time of the main ignition signal IGT and the rising time of the energy supply signal IGW (the time difference when a transition is made from the low state to the high state). The upper limit value and the lower limit value of the target secondary current represent the range of the secondary current Ib that desirably flows through the secondary coil 21 when the energy supply ignition is performed. The range is obtained based on the value of the current that desirably flows through the ignition plug 80 in accordance with the operating conditions of the engine 100.

More specifically, the setting circuit 65 measures the time from when the main ignition signal IGT makes a transition from the low state to the high state to when the energy supply signal IGW makes a transition from the low state to the high state and determines the upper limit value and the lower limit value in accordance with the measured time. The upper limit value and the lower limit value are previously stored in accordance with the measured time. Subsequently (for example, after the predetermined time T1 has elapsed from when the main ignition signal IGT made a transition from the high state to the low state), the setting circuit 65 outputs the determined upper and lower limit values to the feedback circuit 66 and sets the upper limit value and the lower limit value in the feedback circuit 66.

When selecting the energy supply ignition, the ECU 70 changes the rising time difference between the main ignition signal IGT and the energy supply signal IGW in accordance with the operating conditions of the engine 100 to change the lower limit value and the upper limit value in accordance with the operating conditions of the engine 100 and outputs the main ignition signal IGT and the energy supply signal IGW.

After the target secondary current is set, the feedback circuit 66 outputs a signal to the drive circuit 63 during the time period the energy supply signal IGW is being received based on the comparison between the target secondary current and the secondary current Ib detected by the current detection circuit 47. More specifically, the feedback circuit 66 switches between a signal output state in which a signal is output to the drive circuit 63 (brings the signal into the high state) and a signal stop state (brings the signal into the low state) so that the secondary current Ib detected by the current detection circuit 47 is maintained between the lower limit value and the upper limit value of the target secondary current during the time period the energy supply signal IGW is received (during the high state).

Figure 4:
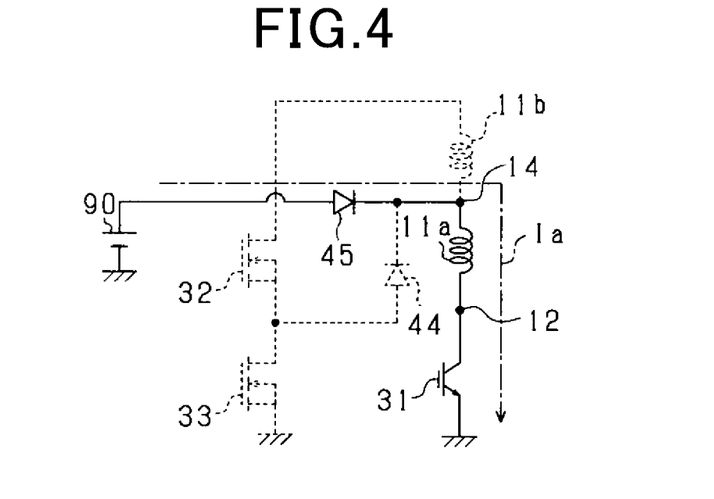
FIG. 4 is a circuit diagram when main ignition is performed.

Subsequently, the manner in which the main ignition is performed will be described based on FIG. 4. As shown in the drawing, after the switching elements 32 and 33 are opened, so that the GND and the second terminal 13 are disconnected (energization is interrupted), the switching element 31 is closed, so that the first terminal 12 and the GND are connected (energization is permitted). Thus, a current is passed from the battery 90 to the first winding 11*a*. At this time, a primary current Ia flows from the center tap 14 to the first terminal 12. In FIG. 4, the energized path is shown by a solid line, and the non-energized path is shown by a broken line.

The secondary current Ib that seeks to flow through the secondary coil 21 at the starting of the energization of the first winding 11*a* is blocked by the diode 46. Since the switching elements 32 and 33 are opened when the main ignition is performed, the current does not flow from the battery 90 to the second winding 11*b*, which inhibits the current that flows through the first winding 11*a* from being decreased by the current that otherwise flows to the second winding 11*b*.

Subsequently, when the switching element 31 is opened, so that the first terminal 12 and the GND are disconnected, a high voltage is generated in the secondary coil 21. Thus, the main ignition is performed at the ignition plug 80, so that the spark discharge is started. At this time, the secondary current Ib flows through the secondary coil 21.

Figure 5:
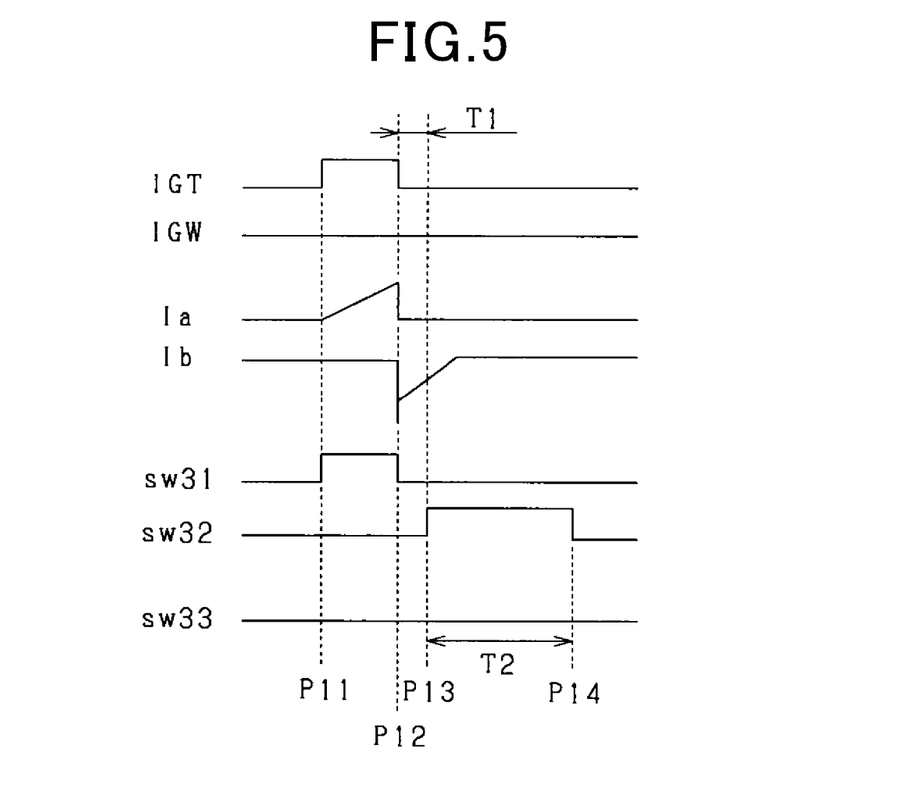
FIG. 5 is a timing chart when the main ignition is performed.

The points in time at which various signals are input and the manner in which the current changes when the main ignition is performed will be described with reference to FIG. 5. In FIG. 5, the main ignition signal IGT is indicated as IGT, and the energy supply signal IGW is indicated as IGW. In FIG. 5, the current that flows through the first winding 11*a* (the primary current) is indicated as Ia, and the current that flows through the secondary coil 21 (the secondary current) is indicated as Ib. In FIG. 5, the signal from the control circuit 60 (more specifically, the drive circuit 61) to the switching element 31 is indicated as sw31. In FIG. 5, the signal from the control circuit 60 (more specifically, the drive circuit 62) to the switching element 32 is indicated as sw32. In FIG. 5, the signal from the control circuit 60 (more specifically, the drive circuit 63) to the switching element 33 is indicated as sw33.

As shown in FIG. 5, the drive circuit 61 of the control circuit 60 controls the switching element 31 to be closed (controls it to be in the ON state, or the connected state. The same applies to the following) for the time period during which the main ignition signal IGT from the ECU 70 is in the high state (points in time P11 to P12). That is, the drive circuit 61 outputs a signal to the switching element 31 from the point in time P11 to the point in time P12 (brings the signal into the high state). Thus, a voltage (battery voltage) is applied to the first winding 11*a* from the battery 90, so that the primary current Ia flows.

When the primary current Ia is increased, and the main ignition signal IGT is brought into the low state at the point in time P12, the drive circuit 61 controls the switching element 31 to be open (controls it to be in the OFF state, or the disconnected state. The same applies to the following). That is, the drive circuit 61 stops outputting a signal to the switching element 31 (brings the signal into the low state) at the point in time P12. Thus, a high voltage occurs in the first winding 11*a* of the primary coil 11 and the secondary coil 21, which generates a spark discharge at the ignition plug 80 and causes the secondary current Ib to flow through the secondary coil 21. Subsequently, the secondary current Ib attenuates. When the secondary current Ib attenuates and becomes less than a discharge maintaining current, which is the minimum current that can maintain the discharge, the discharge at the ignition plug 80 is terminated.

Note that, for example, in the state in which the ignition plug 80 has come off, and the secondary current Ib does not flow through the secondary coil 21, if the switching element 31 is opened and closed to start the spark discharge, a high voltage may possibly occur in the second winding 11*b* that attenuates while alternating between a negative voltage and a positive voltage due to the influence of the voltage that attenuates while alternating between a negative voltage and a positive voltage in the secondary coil 21. If a high positive voltage occurs in the second winding 11b, an overvoltage may possibly be applied to the switching element 32 and the switching element 33. For this reason, the control circuit 60 closes the switching element 32 after starting the spark discharge (after the main ignition) regardless of whether to maintain the spark discharge (even if the energy supply ignition is not performed).

More specifically, at a point in time P13 when the predetermined time T1 has elapsed from the point in time P12 when the main ignition signal IGT made a transition from the high state to the low state, the delay circuit 64 of the control circuit 60 outputs to the drive circuit 62 (brings into the high state). At this time, the delay circuit 64 outputs a signal to the drive circuit 62 only for the predetermined time T2 (brings into the high state).

The drive circuit 62 of the control circuit 60 closes the switching element 32 (connected state, ON state) during the time period the signal is input from the delay circuit 64 (during the high state). That is, the drive circuit 62 outputs a signal to the switching element 32 (brings the signal into the high state) from the point in time P13 to a point in time P14.

Thus, the switching element 32 is closed only for the predetermined time T2 after the predetermined time T1 has elapsed from when the main ignition signal IGT made a transition from the high state to the low state. Thus, even if a high voltage occurs in the second winding 11b, the current is recirculated through the second winding 11b, the switching element 32, and the diode 44 by closing the switching element 32, which inhibits an overvoltage from being applied to the switching element 32. This allows the withstand voltage of the switching element 32 and the switching element 33 to be low. Thus, the ignition system 10 is made small and inexpensive.

Figure 6A:
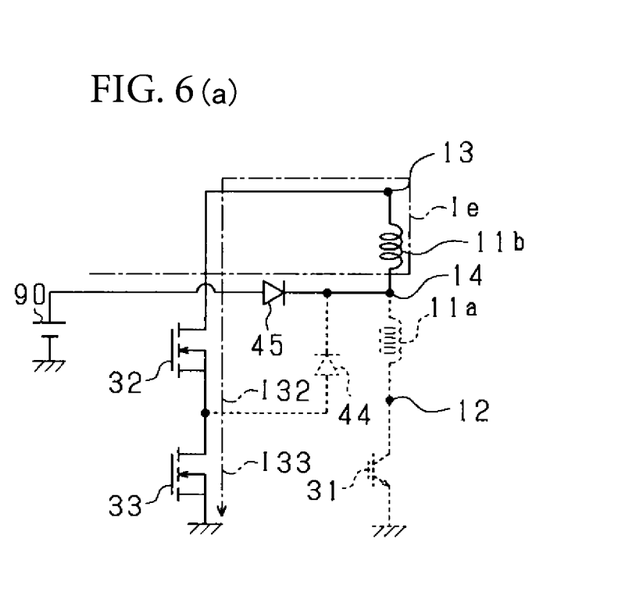
Figure 6B:
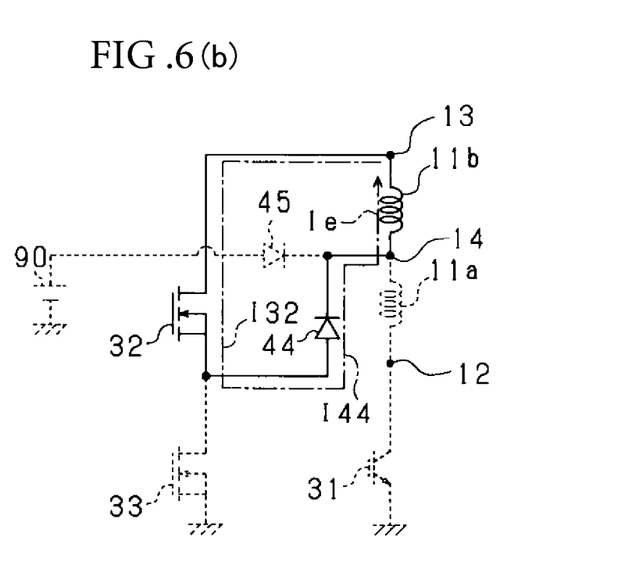

The manner in which the energy supply ignition is performed will be described based on FIG. 6. In FIG. 6, the energized path is shown by a solid line, and the non-energized path is shown by a broken line. As shown in FIG. 6(a), after starting the main ignition, the switching element 32 and the switching element 33 are closed while the switching element 31 is opened. This causes a primary current Ie to flow from the center tap 14 of the primary coil 11 to the second terminal 13 (energy supply). Accordingly, a voltage occurs in the secondary coil 21 in the same direction as the inductive discharge, and the current is superimposed on the secondary current Ib.

The turn ratio between the second winding 11b and the secondary coil 21 is set so that the voltage that occurs in the secondary coil 21 during the energy supply becomes higher than the discharge maintaining voltage necessary for maintaining the spark discharge. More specifically, the turn ratio, which is the value obtained by dividing the number of turns of the secondary coil 21 by the number of turns of the second winding 11b, is greater than the voltage ratio, which is the value obtained by dividing the discharge maintaining voltage necessary for maintaining the spark discharge by the applied voltage of the battery 90.

Note that, the number of turns of the first winding 11a is greater than the number of turns of the second winding 11b so that an appropriate voltage occurs in the secondary coil 21 and an appropriate secondary current Ib flows when the spark discharge is started. That is, the first winding 11a has a greater impedance than the second winding 11b.

As the energy is supplied, the secondary current Ib is gradually increased. The switching element 33 is opened to stop the energy supply and thus the increase in the secondary current Ib so that the secondary current Ib is within the predetermined range.

When the switching element 33 is opened, the increase in the secondary current Ib is stopped. However, if the current that flows through the second winding 11b is stopped, the secondary current Ib is rapidly decreased undesirably. If the secondary current Ib is rapidly decreased, the spark discharge can no longer be maintained and is interrupted. Even if the energy supply is resumed after the spark discharge is interrupted, the spark discharge may possibly be terminated since a voltage caused by the second winding 11b is so low that the spark discharge is not achieved, and, thus, the current is not passed.

The ignition system 10 of the present embodiment includes the diode 44. Thus, as shown in FIG. 6(b), when the switching element 33 is opened, the recirculated current flows through a recirculation path including the diode 44→the center tap 14→the second winding 11b→the second terminal 13→the switching element 32→and the diode 44. Thus, since the primary current Ie flows through the second winding 11b while gradually attenuating, the secondary current Ib is also inhibited from being rapidly decreased and is gradually decreased. This facilitates controlling to a predetermined secondary current Ib while preventing the interruption of the spark discharge.

Subsequently, the switching element 33 is opened and closed so that the secondary current Ib is within the predetermined range. Thus, the energy supply ignition is performed at the ignition plug 80, so that the spark discharge is maintained.

Figure 7:
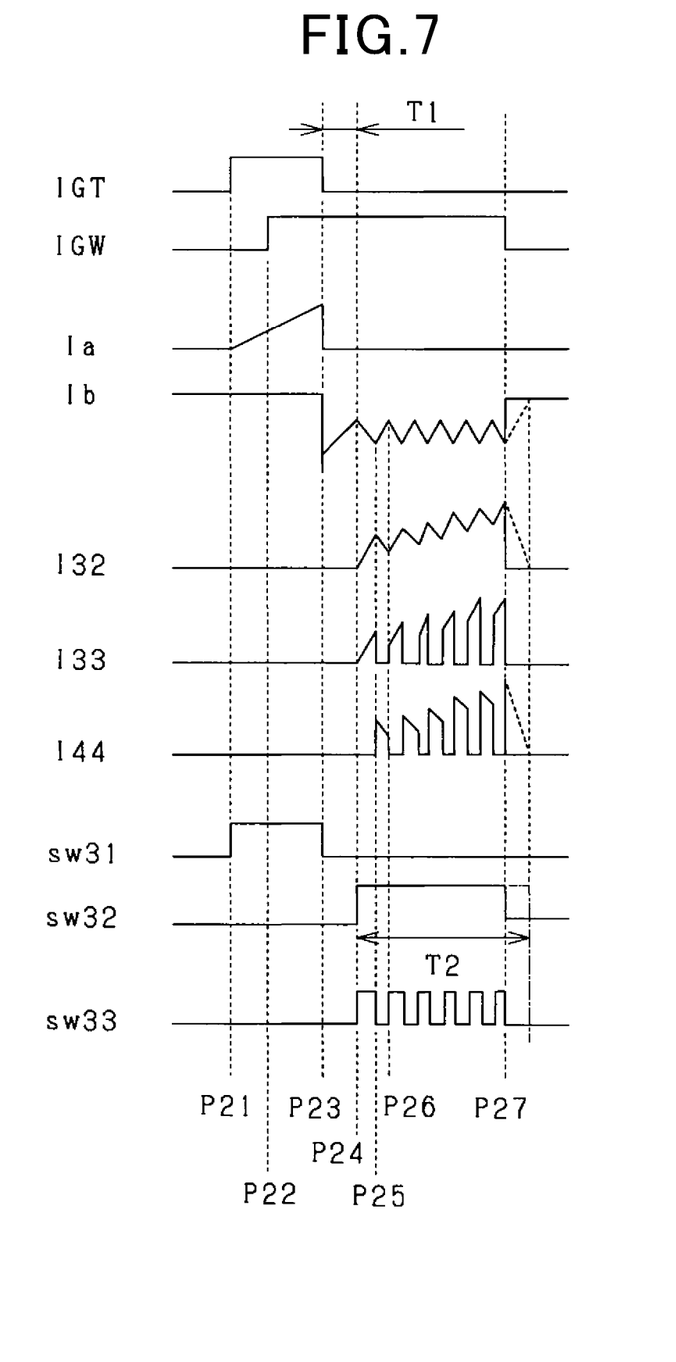
FIG. 7 is a timing chart when the energy supply ignition is performed.

The points in time various signals are input and the manner in which the current changes when the energy supply ignition is performed after the main ignition will be described based on FIG. 7. IGT, IGW, Ia, Ib, sw31, sw32, and sw33 in FIG. 7 have the same meaning as those in FIG. 5. In FIG. 7, the current that flows through the switching element 32 is indicated by I32, the current that flows through the switching element 33 is indicated by I33, and the current that flows through the diode 44 is indicated by I44. As shown in FIG. 7, the energy supply ignition is performed by the control circuit 60 if the energy supply signal IGW is in the high state when the main ignition signal IGT makes a transition from the high state to the low state.

At a point in time P21, when the main ignition signal IGT is brought into the high state, the drive circuit 61 controls to close the switching element 31. That is, the drive circuit 61 outputs a signal to the switching element 31 (brings into the high state). Thus, a voltage (battery voltage) is applied to the first winding 11a from the battery 90, and the primary current Ia flows. Subsequently, the primary current Ia is gradually increased until the switching element 31 is opened (the point in time P21 to a point in time P23).

At the point in time P23 when the main ignition signal IGT is brought into the low state, the drive circuit 61 controls to open the switching element 31. That is, the drive circuit 61 stops outputting a signal to the switching element 31 (brings into the low state). This causes a high voltage in the first winding 11a of the primary coil 11 and the secondary coil 21, so that a spark discharge is generated at the ignition plug 80, and the secondary current Ib flows through the secondary coil 21. Subsequently, the secondary current Ib of the secondary coil 21 is gradually decreased until the energy is supplied (the point in time P23 to a point in time P24).

At the point in time P24 when the predetermined time T1 has elapsed from the point in time P23 at which the main ignition signal IGT made a transition from the high state to the low state, the drive circuit 62 receives a signal from the delay circuit 64 and controls to close the switching element 32. That is, at the point in time P24, the drive circuit 62 outputs a signal to the switching element 32 (brings into the high state). Thus, the switching element 32 is closed after the predetermined time T1 has elapsed from the point in time P23 at which the main ignition signal IGT made a transition from the high state to the low state.

At the point in time P24, the setting circuit 65 sets the upper limit value and the lower limit value of the target secondary current in the feedback circuit 66. The upper limit value and the lower limit value of the target secondary current are set in accordance with the time period from the point in time P21 at which the main ignition signal IGT made a transition from the low state to the high state to a point in time P22 at which the energy supply signal IGW made a transition from the low state to the high state.

After the target secondary current is set, the drive circuit 63 controls the opening and closing of the switching element 33 based on the signal from the feedback circuit 66 for the time period (the point in time P24 to a point in time P27) during which the energy supply signal IGW is in the high state. That is, the drive circuit 63 switches between the signal output state in which a signal is output to the switching element 33 and the signal stop state based on the signal from the feedback circuit 66 so that the secondary current Ib is maintained between the lower limit value and the upper limit value of the target secondary current.

For example, if the absolute value of the secondary current Ib becomes less than or equal to the lower limit value of the target secondary current, as shown in the point in time P24 to a point in time P25, the control circuit 60 outputs signals to the switching elements 32 and 33 (brings the signals into the high state), so that the switching elements 32 and 33 are closed.

This causes the primary current Ie to flow from the center tap 14 of the primary coil 11 to the second terminal 13 (energy supply). That is, the current 132 (≈primary current Ie) flows through the switching element 32, and the current 133 (≈primary current Ie) flows through the switching element 33. Accordingly, a voltage is generated in the secondary coil 21 in the same direction as the inductive discharge, and the current is superimposed on the secondary current Ib, so that the secondary current Ib is increased. The primary current Ie is increased in accordance with the energy supply. During that time, no current flows through the diode 44.

If, for example, the absolute value of the secondary current Ib becomes greater than or equal to the upper limit value of the target secondary current, as shown in the point in time P25 to a point in time P26, the control circuit 60 stops outputting a signal to the switching element 33 (brings into the low state) with the switching element 32 kept closed, so that the switching element 33 is opened. This stops power supply (energy supply) from the battery 90 to the second winding 11b.

At this time, the recirculated current caused by the inductance of the second winding 11b flows through the recirculation path including the diode 44→the center tap 14→the second winding 11b→the second terminal 13→the switching element 32→and the diode 44. That is, as shown in FIG. 7, the current 132 flows through the switching element 32, and the current 144 (≈132) flows also through the diode 44. Meanwhile, the current 133 does not flow through the switching element 33.

In this manner, since the recirculated current flows through the second winding 11b, the primary current Ie is inhibited from being rapidly decreased, and thus the secondary current Ib is inhibited from being rapidly decreased and is gradually decreased. This facilitates controlling the secondary current Ib so as to be within the predetermined range.

As described above, the control circuit 60 controls the switching elements 32 and 33 so that the secondary current Ib is maintained between the lower limit value and the upper limit value of the target secondary current during the time period the energy supply signal IGW is in the high state (the point in time P24 to the point in time P27).

Subsequently, when the energy supply signal IGW makes a transition from the high state to the low state (the point in time P27), the control circuit 60 stops outputting signals to the switching elements 32 and 33 (brings into the low state), so that the switching elements 32 and 33 are opened. This attenuates the secondary current Ib, and when the secondary current Ib becomes less than the discharge maintaining current, which is the minimum current that can maintain the discharge, the discharge at the ignition plug 80 is terminated.

The time period from the point in time P23 at which the main ignition signal IGT makes a transition from the high state to the low state to the point in time P27 at which the energy supply signal IGW makes a transition from the high state to the low state is set by the ECU 70 in accordance with, for example, the operating conditions of the engine 100.

The above-described embodiment achieves the following excellent advantages.

According to the ignition system 10, when starting the spark discharge, the control circuit 60 closes the switching element 31 to pass a current from the battery 90 to the first winding 11a, and subsequently opens the switching element 31 to interrupt the passage of the current from the battery 90 to the first winding 11a. This causes the secondary current Ib to flow through the secondary coil 21, so that the spark discharge is caused at the ignition plug 80. When maintaining the spark discharge, the control circuit 60 closes, after starting the spark discharge, the switching element 32 and the switching element 33 to pass a current from the battery 90 to the second winding 11b. This allows the current to flow in the same direction as and be superimposed on the discharging secondary current Ib that flows through the secondary coil 21, so that the spark discharge is maintained.

When maintaining the spark discharge, the control circuit 60 opens the switching element 33 with the switching element 32 kept closed to recirculate the current to the second winding 11b through the diode 44. Thus, in maintaining the spark discharge, the current that flows through the second winding 11b is prevented from being rapidly decreased, which inhibits the secondary current Ib that flows through the secondary coil 21 from being rapidly decreased. Since the primary current Ie that flows through the second winding 11b is controlled so that the secondary current Ib is within the predetermined range, it is easy for the control circuit 60 to open and close the switching element 33 at appropriate points in time.

The switching element 32 and the switching element 33 are connected in series. Thus, even if a malfunction occurs in which an overvoltage is applied from the side of the battery 90, such as from the connection terminal to which the battery 90 is connected, the applied voltage is distributed to the switching element 32 and the switching element 33. Thus, transistors with a low withstand voltage can be used, which allows the ignition system to be inexpensive and small. Since the switching element 31 is a high breakdown voltage element, and the impedance of the first winding 11*a* can be greater than that of the second winding 11*b*, the switching element 31 is protected even if a malfunction occurs in which an overvoltage is applied from the side of the battery 90.

As described above, according to the ignition system 10, an overvoltage is inhibited from being applied to the switching elements 31 to 33, and the secondary current Ib is inhibited from being rapidly decreased in maintaining the spark discharge.

When starting the spark discharge, the control circuit 60 opens the switching element 32 to interrupt the passage of the current from the battery 90 to the second winding 11*b* and closes the switching element 31 to pass a current from the battery 90 to the first winding 11*a*. Subsequently, the control circuit 60 opens the switching element 31 to interrupt the passage of the current from the battery 90 to the first winding 11*a*. This prevents a current from flowing from the battery 90 to the second winding 11*b* when the spark discharge is started. Thus, in starting the spark discharge, the current that flows through the first winding 11*a* is prevented from being decreased, so that the spark discharge is started in an appropriate manner.

When maintaining the spark discharge (when performing the energy supply ignition) after the spark discharge is started, the control circuit 60 closes the switching element 32 and opens and closes the switching element 33 with the switching element 32 kept closed. Thus, the passage of the current from the battery 90 to the second winding 11*b* is repeated. This allows a current to flow in the same direction as and be superimposed on the secondary current Ib that flows through the secondary coil 21, so that the spark discharge is maintained.

When maintaining the spark discharge, the control circuit 60 opens the switching element 33 with the switching element 32 kept closed to recirculate the current to the second winding 11*b* through the diode 44. Thus, in maintaining the spark discharge, the primary current Ie that flows through the second winding 11*b* is prevented from being rapidly decreased and is gradually decreased. This inhibits the secondary current Ib that flows through the secondary coil 21 from being rapidly decreased, which prevents the spark discharge from being interrupted.

When maintaining the spark discharge, the control circuit 60 opens and closes the switching element 33 based on the secondary current Ib detected by the current detection circuit 47. Thus, the secondary current Ib is maintained to an appropriate value, and the spark discharge is maintained in an appropriate manner.

For example, in the state in which the ignition plug 80 has come off, and no current is flowing through the secondary coil 21, if the switching element 31 is opened and closed to start the spark discharge, a positive high voltage may possibly occur in the second winding 11*b*. When a high voltage occurs in the second winding 11*b*, an overvoltage may possibly be applied to the switching element 32 and the switching element 33. For this reason, the control circuit 60 closes the switching element 32 after starting the spark discharge (main ignition) regardless of whether to maintain the spark discharge (energy supply ignition). Thus, even if a positive high voltage occurs in the second winding 11*b*, the current is recirculated through the second winding 11*b*, the switching element 32, and the diode 44 by closing the switching element 32. This inhibits an overvoltage from being applied to the switching element 32 and the switching element 33 and protects the switching element 32 and the switching element 33. Thus, inexpensive small elements with a low withstand voltage can be used.

The switching elements 32 and 33 include the antiparallel connected diodes 42 and 43. Thus, if the battery 90 is connected in reverse, a large current may possibly flow through the circuit via the diodes 42 and 43. For this reason, the backflow prevention diode 45 is provided between the center tap 14 and the battery 90. The backflow prevention diode 45 protects the circuit even if the battery 90 is connected in reverse. In particular, even if the impedance of the second winding 11*b* is small as in the ignition system 10, a large current is prevented from flowing through the circuit.

After the interruption of the passage of the current to the primary coil 11 for starting the spark discharge, the side of the second terminal 13 of the second winding 11*b* may possibly have a negative potential. However, since the backflow prevention diode 45 is provided, the current is prevented from flowing through the path including the GND→the switching element 33→the switching element 32→the second winding 11*b*→and the battery 90.

The turn ratio, which is the value obtained by dividing the number of turns of the secondary coil 21 by the number of turns of the second winding 11*b*, is greater than the voltage ratio, which is the value obtained by dividing the discharge maintaining voltage necessary for maintaining the spark discharge by the applied voltage of the battery 90. Thus, in maintaining the spark discharge, the energy is supplied from, for example, the vehicle-mounted battery without a boost circuit.

The battery 90, which applies a voltage to the first winding 11*a*, is the vehicle-mounted power supply and is shared as the power supply for applying a voltage to the second winding 11*b*. Thus, since no power supply needs to be provided within the ignition system 10, the ignition system 10 is reduced in size. Since the use of the vehicle-mounted power supply eliminates the need for a special power supply, the ignition system 10 is reduced in size. Additionally, since the shared use of the battery 90 eliminates the need for multiple power supplies, the ignition system 10 is reduced in size.

The primary coil 11, the secondary coil 21, the switching elements 31 to 33, the diode 44, and the control circuit 60 are accommodated in the case 50 of the ignition coil. Thus, the ease of mounting the ignition system 10 on the vehicle is improved and the wiring is reduced.

In executing the main ignition, the primary current Ia flows through the first winding 11*a*, and in executing the energy supply, the primary current Ie flows through the second winding 11*b*. This allows the turn ratio between the first winding 11*a* and the secondary coil 21 to be set regardless of the number of turns of the second winding 11*b*. Thus, at the time of starting the passage of the current to the first winding 11*a*, the secondary voltage caused in the secondary coil 21 is limited to be low. Consequently, the voltage applied to the diode 46 is reduced, which allows the diode 46 to have a low withstand voltage, or the diode 46 to be omitted. Thus, the costs of the ignition system 10 are reduced.

The control circuit 60 sets the upper limit value and the lower limit value of the target secondary current based on the rising time difference between the main ignition signal IGT and the energy supply signal IGW and controls the opening and closing of the switching element 33 so that the secondary current Ib is within the range. Also, whether the energy supply is performed is controlled in accordance with whether the energy supply signal IGW is input. Thus, the ECU 70 controls the secondary current Ib and the energy supply time in an appropriate manner in accordance with the operating conditions of the engine 100 and the environment. This reduces the power consumption and inhibits the wearing out of the ignition plug 80 while improving the ignitability.

Other Embodiments

The present disclosure is not limited to the above-described embodiment, but may be embodied as follows, for example. In the following, the same reference numerals are given to those components that are the same or equal to each other in the embodiments, and the descriptions for the components with the same reference numerals are incorporated herein by reference.

Figure 8:
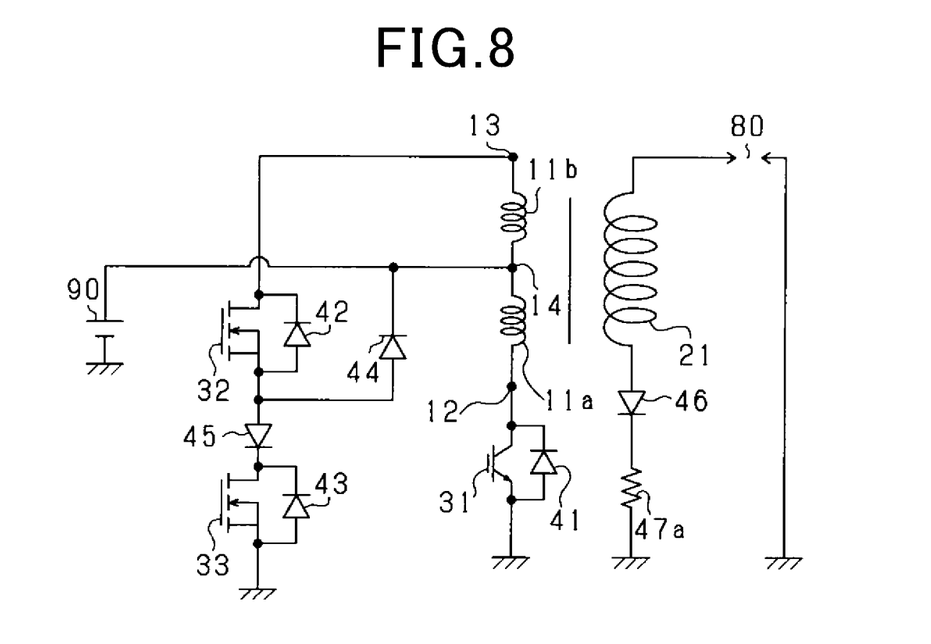
FIG. 8 is a circuit diagram showing an electrical configuration according to a modification of the ignition system.

In the above-described embodiment, the location of the backflow prevention diode 45 may be changed. For example, as shown in FIG. 8, the backflow prevention diode 45 may be located between the switching element 32 and the switching element 33. The anode of the backflow prevention diode 45 may be connected to the anodes of the switching element 32 and the diode 44, and the cathode of the backflow prevention diode 45 may be connected to the switching element 33.

This protects the circuit even if the battery 90 is connected in reverse. In particular, even if the impedance of the second winding 11b is small, a large current is prevented from flowing through the circuit. Unlike the case in which the backflow prevention diode 45 is located between the center tap 14 and the battery 90, the current supplied to the first winding 11a when the main ignition is performed does not flow through the backflow prevention diode 45. Thus, the amount of heat generation is reduced. Additionally, the voltage applied from the battery 90 to the first winding 11a is inhibited from being decreased due to the backflow prevention diode 45. In this case also, since the impedance of the first winding 11a may be set greater than that of the second winding 11b, a large current is unlikely to flow through the switching element 31 even if the battery 90 is connected in reverse.

In the above-described embodiment, the first winding 11a and the second winding 11b are formed by providing the center tap 14 on the primary coil 11, but the first winding 11a and the second winding 11b may be formed by separate windings.

In the above-described embodiment, the control circuit 60 opens the switching element 32 when starting the spark discharge, but the control circuit 60 may close the switching element 32.

In the above-described embodiment, the upper limit value and the lower limit value of the target secondary current may be certain values and may be previously set in the feedback circuit 66. Thus, the setting circuit 65 may be omitted.

In the above-described embodiment, the upper limit value and the lower limit value of the target secondary current are set based on the rising time difference between the main ignition signal IGT and the energy supply signal IGW. However, the setting method may be changed as required. For example, the setting circuit 65 may receive a setting instruction signal from the ECU 70 and may set the upper limit value and the lower limit value of the target secondary current based on the instruction signal.

In the above-described embodiment, the control circuit 60 does not necessarily have to perform a feedback control procedure and may control the opening and closing of the switching element 33 based on predetermined times. For example, when executing the energy supply ignition, the control circuit 60 may switch the open and closed states of the switching element 33 at every predetermined switching time. In this case, since the secondary current Ib does not need to be detected, the current detection circuit 47 may be omitted. The feedback circuit 66 may also be omitted. The predetermined switching time may be set by the setting circuit 65, or may be set by the ECU 70.

In the above-described embodiment, after the main ignition, the control circuit 60 closes the switching element 32 regardless of whether to the spark discharge is to be maintained. However, the control circuit 60 does not necessarily have to close the switching element 32 if the spark discharge is not to be maintained.

In the above-described embodiment, the backflow prevention diode 45 may be omitted.

In the above-described embodiment, all or some of the components of the ignition system 10 do not necessarily have to be accommodated in the case 50 of the ignition coil.

In the above-described embodiment, the battery 90 is shared, but multiple power supplies may be provided. That is, power supplies with different voltages may be used in the main ignition and in the energy supply. Thus, for example, the turn ratio between the second winding 11b and the secondary coil 21 can be adjusted.

In the above-described embodiment, the vehicle-mounted power supply is used as the battery 90, but a power supply may be provided in the ignition system 10.

In the above-described embodiment, a boost circuit may be provided for the energy supply. When executing the energy supply ignition, the control circuit 60 may apply a voltage boosted by the boost circuit to the second winding 11b. Thus, for example, the turn ratio between the second winding 11b and the secondary coil 21 may be adjusted.

The ignition system 10 of the above-described embodiment is employed in the multi-cylinder engine, but may be employed in a single-cylinder engine. The ignition system 10 may be applied to an internal combustion engine that uses fuel other than gasoline.

In the above-described embodiment, the output time (time T2) of the signal from the delay circuit 64 to the drive circuit 62 is greater than the maximum value of the supply time of the energy supply signal IGW, but may be changed as required. In this case, the time is preferably greater than the maximum time of the time from the falling of the main ignition signal IGT to the falling of the energy supply signal IGW. The output time (time T2) of the signal from the delay circuit 64 to the drive circuit 62 when only the main ignition is performed may differ from that when the energy supply ignition is performed.

In the above-described embodiment, the delay time (time T1) from when the main ignition signal IGT makes a transition from the high state to the low state to when the delay circuit 64 outputs a signal to the drive circuit 62 may be changed as required. The delay time when only the main ignition is performed may differ from that when the energy supply ignition is performed.

Although the present disclosure has been described in accordance with the embodiments, it is understood that the present disclosure is not limited to the embodiments and the configurations. The present disclosure embraces various modifications and deformations that come within the range of equivalency. Additionally, various combinations and forms, or other combinations and forms including only one or more additional elements, or less than all elements are included in the scope and ideas obtainable from the present disclosure.

What is claimed is:

1. An ignition system which causes an ignition plug to generate a spark discharge, the ignition system comprising:
    a primary coil including a first winding and a second winding connected in series with the first winding,
    a power supply connected to a contact point between the first winding and the second winding;
    a secondary coil which is connected to the ignition plug and is magnetically coupled to the primary coil;
    a first switch which is located closer to the first winding than the contact point and is connected in series with the first winding;
    a second switch which is connected in series with the second winding on the opposite side from the contact point;
    a third switch which is located between a ground and the second switch and is connected in series with the second switch;
    a first diode including an anode connected between the second switch and the third switch and a cathode connected to the contact point; and
    switch control circuit, configured to control opening and closing of the first switch, the second switch, and the third switch.

2. The ignition system according to claim 1, wherein when starting the spark discharge, the switch control circuit opens the second switch and closes the first switch to pass a current from the power supply to the first winding, and subsequently opens the first switch to interrupt a passage of the current from the power supply to the first winding.

3. The ignition system according to claim 1, wherein when maintaining the spark discharge after starting the spark discharge, the switch control circuit closes the second switch and opens and closes the third switch with the second switch kept closed.

4. The ignition system according to claim 3, further comprising:
    a secondary current detection circuit, configured to detect a secondary current that flows through the secondary coil, wherein
    when maintaining the spark discharge, the switch control circuit opens and closes the third switch based on the secondary current detected by the secondary current detection circuit.

5. The ignition system according to claim 1, wherein when starting the spark discharge, the switch control circuit closes the second switch after starting the spark discharge regardless of whether to maintain the spark discharge.

6. The ignition system according to claim 1, further comprising:
    a backflow prevention diode which is located between the contact point and the power supply and includes an anode connected to a side of the power supply and a cathode connected to a side of the contact point.

7. The ignition system according to claim 1, further comprising:
    a backflow prevention diode which is a second diode connected between the second switch and the third switch and includes an anode connected to an anode of the second switch and the first diode and a cathode connected to the third switch.

8. The ignition system according to claim 1, wherein a turn ratio, which is a value obtained by dividing the number of turns of the secondary coil by the number of turns of the second winding, is greater than a voltage ratio, which is a value obtained by dividing a discharge maintaining voltage necessary for maintaining the spark discharge by an applied voltage of the power supply.

9. The ignition system according to claim 1, wherein the power supply, configured to apply a voltage to the first winding, is a vehicle-mounted power supply and is shared as a power supply for applying a voltage to the second winding.

10. The ignition system according to claim 1, wherein the primary coil, the secondary coil, the first switch, the second switch, the third switch, the diode, and the switch control circuit are accommodated in a case of an ignition coil.

* * * * *